March 10, 1959
L. LINDSTROM
2,876,486
HANDGRIP FOR WHEEL CHAIRS
Filed July 22, 1957
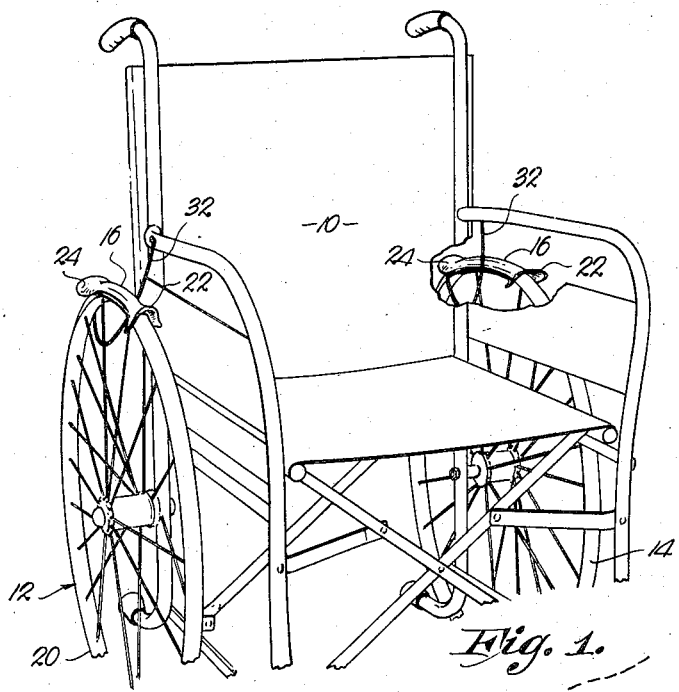
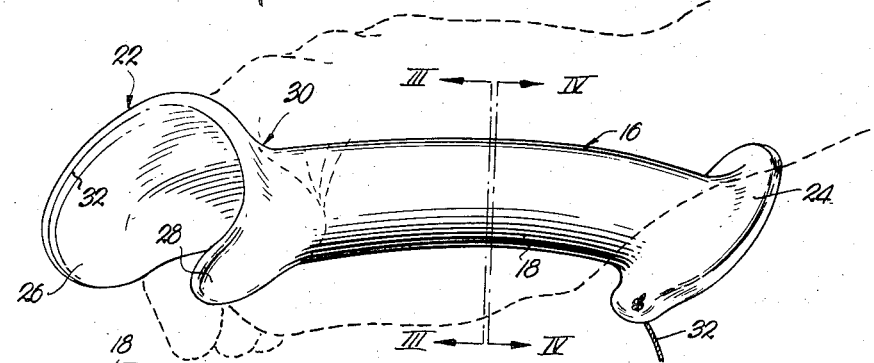
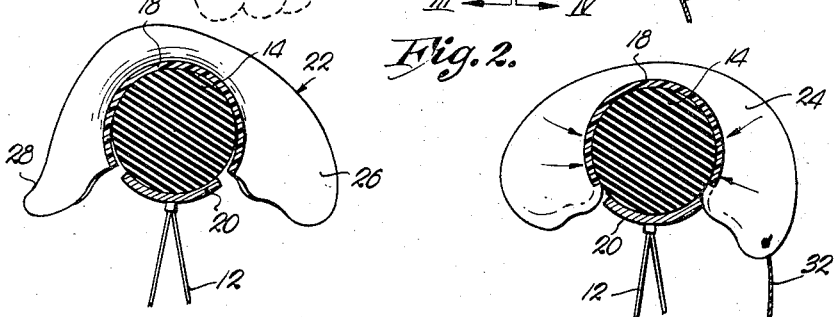
INVENTOR.
Lilla Lindstrom
BY 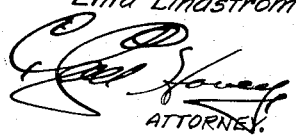
ATTORNEY.

United States Patent Office 2,876,486
Patented Mar. 10, 1959

2,876,486

HANDGRIP FOR WHEEL CHAIRS

Lilla Lindstrom, Kansas City, Mo.

Application July 22, 1957, Serial No. 673,240

1 Claim. (Cl. 16—110)

This invention relates to an accessory for wheel chairs and, more particularly, to a device for facilitating the hand propelling of such instrumentatilities by the occupant, the primary object being to permit the use of the tire of the wheel chairs in lieu of the conventional handrim and at the same time protect the hands of the user from dirt that normally collects on the tire.

Conventional wheel chairs are provided with continuous annular handrims attached to the two large wheels thereof designed to be used by the occupant of the chair for propelling purposes. These rims, which are small in circumference, are difficult to manipulate however, particularly by elderly people and others who, because of arthritis or other infirmities, are unable to firmly grip the handrim. It is necessary for many to use the tire of the vehicle itself since, by virtue of its large diameter, a firmer grip may be made than is possible on the handrim of small diameter. As the result of using the tires themselves, therefore, the hands become soiled from the dirt collecting on the tire, thereby increasing the attention necessary by nurses and others who assist the patient.

It is the most important object of the present invention, therefore, to provide a handgrip for a wheel chair tire that may be used by the occupant in propelling the wheel chair, thereby eliminating the necessity of the conventional rim and, at the same time, protecting the hands of the user from coming into contact with the tire itself.

Another important object of the present invention is to provide a handgrip of the aforementioned character which readily and easily slips into place over the tire, cannot be accidentally displaced therefrom, normally slides along the tire and, at the same time, is adapted to be squeezed or pressed with little effort against the tire as the handgrip is placed in use to propel the wheel chair.

These and other objects will become clear as the following specification progresses, reference being had to the accompanying drawing wherein:

Fig. 1 is a fragmentary, perspective view of a wheel chair having the improved handgrips of the instant invention operably mounted thereon.

Fig. 2 is an enlarged, side perspective view showing the left side of the handgrip for the right wheel; and Figs. 3 and 4 are cross-sectional views taken on lines III—III and IV—IV of Fig. 2 respectively, but showing the same in operative relationship to the tire of the wheel chair.

Wheel chair 10 illustrated in Fig. 1 of the drawing may be of conventional character other than the fact that the usual type of hand-propelling handrim attached to wheels 12 thereof may be eliminated when the improvements of the instant invention are utilized.

As above indicated, when it is not possible for the occupant of chair 10 to grip the aforementioned handrim with sufficient tightness to move the wheel chair, the occupant quite naturally always uses the wheels 12 themselves, since the diameter of tires 14 thereof is sufficiently great to more readily permit a tight grip. This soils the hands and therefore, in accordance with the instant invention, there is provided a handgrip broadly designated by the numeral 16 for each tire 14 respectively. The handgrips 16 are identical except for the shape of the front ends which are in reverse order to fit right and left hands.

Handgrip 16 includes an elongated, hollow body 18 of thin metal or other flexible material that holds its shape well and is longitudinally arched as seen in Fig. 2, to conform with the circumferential configuration of the tire 14, and which is also transversely arched as best seen in Figs. 3 and 4, to conform with the circular or substantially circular transverse configuration of tire 14.

It is to be noted in Figs. 3 and 4 that the body 18 does not define a complete tube transversely thereof, but is cut away to clear the rim 20 of wheel 12. It is to be preferred, however, that body 18 be greater than a semicircle in transverse cross section so that when the grip 16 is placed on the tire 14, it cannot become accidentally displaced. To this end the rubber tire, which can be slightly indented by pressure, will permit body 18 to be slipped or snapped into place in partial circumscribing relationship to the tire 14, especially since body 18 is also flexible. The diameter of the body 18 should, however, be slightly greater than the diameter of the tire 14 so that normally, the grip 16 will slide readily along the tire 14 circumferentially of the latter.

Body 18 is provided with an upwardly-flared portion 22 at the forwardmost end thereof and with an upwardly-flared portion 24 at its rearmost end. Both portions 22 and 24 are designed to fit the hand, yet protect the same from the dirt of tire 14 and prevent slipping of the hand from the grip 16 during use thereof.

The uwardly-flared forward end 22 of the body 18 includes as a part thereof, therefore, an elongated portion 26 extending forwardly and downwardly therefrom for receiving the index finger of the user. By the same token, the end 22 of body 14 is provided with a downwardly and forwardly extending end 28 for receiving the thumb of the user. By virtue of such construction there is presented, therefore, a saddle 30 between the portions 26 and 28 at about two-thirds the distance from the outside of body 18 which fits into the crotch of the hand between the thumb and index finger.

To the end that the portion 26 and end portion 28 more readily conform to the configurations of the index finger and the thumb, both portions are transversely concave throughout the length thereof. A downturned flange or bead 32 throughout the length of the upturned end 22 may be provided, not only to strengthen the entire device and thereby permit the use of material that may be slightly flexed, but also to protect the hands from the very edge itself.

The upwardly-flared end 24 of the body 18 differs somewhat from the shape of the end 22 in that it is designed to receive the back of the palm of the hand. To this end the portion 24 is slightly semicircular and disposed substantially centrally across the rearmost end of the body 18. Here again, however, it is to be preferred that the flared end 24 be provided with a slight concavity in the upper face thereof and extending throughout its entire length. This permits the end 24 to snugly and comfortably receive the back of the palm of the hand. Since the two upwardly-flared ends are only for the purpose of keeping the hands from slipping off the handgrip, the over-all length of the handgrip can be made of sufficient length for all sizes of hands.

After the handgrips 16 have been snapped into place in the manner illustrated in Fig. 1 of the drawing, the same are ready for use by an occupant of the wheel chair 10. It is seen that a firm grip may be had on the wheel when the hand is clasped over the handgrip and around the tire as shown in Fig. 2. While the grip is maintained on the body 18, wheels 12 are propelled forwardly in the usual manner, whereupon the grip on the wheel is discontinued and the operator pulls the grips 16 rearwardly, causing the same to slide along the tire 14. In any event, in either direction of movement of the vehicle 10, the upwardly-turned ends 22 and 24 of the body 18 aid in preventing the hand from slipping off the grip, as well as aid the user in pushing the handgrips either forwardly or in reverse during the wheel-propelling operations.

Inasmuch as the grips 16 are adapted to freely slide along the tires 14 when not pressed thereagainst, it is desirable that chains or cords 32 of required length, be used to attach the grips 16 to the wheel chair 10 so that the grips 16 cannot slide out of reach at any time.

Having thus described the invention what is claimed as new and desired to be secured by Letters Patent is:

A handgrip for a wheel chair tire comprising an elongated, flexibly resilient body having an elongated, longitudinally arched and transversely curved, middle section of generally circular transverse cross section interrupted along its lower extremity to permit emplacement of same on said tire and clearance of spoke or rim structure supporting the tire, an upwardly flared, forward end section provided at one side thereof with an elongated portion extending forwardly and downwardly for receiving the index finger of a user and at the other side thereof with a downwardly and forwardly extending portion for receiving the thumb of the user, and an upwardly flared, arcuate rear end section provided with a concavity for receiving the rear edge of the hand of the user, said middle section being alternately adapted to normally slide along the top of the tire and to be distorted for gripping the tire when squeezed.

References Cited in the file of this patent

UNITED STATES PATENTS

| | | |
|---|---|---|
| 614,173 | Kelly | Nov. 15, 1898 |
| 1,613,160 | Chew | Jan. 4, 1927 |
| 2,173,451 | Lorber | Sept. 19, 1939 |
| 2,421,339 | Leger | May 27, 1947 |